United States Patent [19]

Liu

[11] Patent Number: 4,476,274

[45] Date of Patent: Oct. 9, 1984

[54] LINEAR LOW DENSITY POLYETHYLENE IMPACT MODIFIER FOR THERMOPLASTIC POLYESTERS

[75] Inventor: Nan-I Liu, Mt. Vernon, Ind.

[73] Assignee: General Electric Company, Pittsfield, Mass.

[21] Appl. No.: 454,930

[22] Filed: Jan. 3, 1983

[51] Int. Cl.$^3$ .................... C08L 25/10; C08L 67/02; C08K 3/34; C08K 3/40

[52] U.S. Cl. ........................ 524/445; 523/521; 523/526; 523/527; 524/449; 524/504; 524/505; 524/508; 524/513; 525/64; 525/67; 525/92; 525/146; 525/147

[58] Field of Search .................... 523/521, 526, 527; 525/64, 67, 146, 147, 92; 524/513, 449, 445, 504, 505, 508

[56] References Cited

U.S. PATENT DOCUMENTS

| | | | |
|---|---|---|---|
| 3,368,995 | 3/1968 | Furukawa et al. | 260/40 |
| 3,405,198 | 10/1968 | Rein | 525/177 |
| 3,769,260 | 10/1973 | Segal | 260/40 R |
| 3,814,725 | 6/1974 | Zimmerman et al. | 260/40 R |
| 3,900,549 | 8/1975 | Yamane et al. | 264/176 F |
| 3,937,757 | 2/1976 | Seydl et al. | 260/873 |
| 3,944,699 | 3/1976 | Mathews et al. | 428/220 |
| 3,953,394 | 4/1976 | Fox et al. | 260/40 R |
| 4,046,837 | 9/1977 | Carroll, Jr. | 260/873 |
| 4,076,698 | 2/1978 | Anderson et al. | 526/348.6 |
| 4,080,354 | 3/1978 | Kramer | 523/527 |
| 4,081,424 | 3/1978 | Gergen et al. | 260/42.18 |
| 4,097,446 | 6/1978 | Abolins et al. | 260/40 R |
| 4,111,895 | 9/1978 | Gergen et al. | 524/505 |
| 4,122,061 | 10/1978 | Holub et al. | 260/40 R |
| 4,123,415 | 10/1978 | Wambach | 260/40 R |
| 4,128,607 | 12/1978 | Shiomura et al. | 260/878 B |
| 4,185,047 | 1/1980 | Cohen | 525/94 |
| 4,217,426 | 8/1980 | McConnell et al. | 525/173 |
| 4,290,937 | 9/1981 | Cohen | 260/40 R |
| 4,354,009 | 10/1982 | Goeke et al. | 526/125 |
| 4,370,438 | 1/1983 | DeGuia | 524/513 |
| 4,393,153 | 7/1953 | Hepp | 524/449 |
| 4,401,785 | 8/1983 | Liu et al. | 524/508 |
| 4,414,352 | 11/1983 | Cohen et al. | 524/513 |
| 4,430,476 | 2/1984 | Liu | 525/146 |

FOREIGN PATENT DOCUMENTS 4645 10/1979 European Pat. Off. .

OTHER PUBLICATIONS

Heinert, O. H.; Polycarbonate Blends with Improved Critical Thickness, Research Disclosure, Aug. 1981, p. 309 #20810.

New Route to Low-Density Polyethylene, Chemical Engineering, Dec. 3, 1979, pp. 80-85.

*Primary Examiner*—Herbert J. Lilling
*Attorney, Agent, or Firm*—Edward K. Welch, II; William F. Mufatti

[57] ABSTRACT

High molecular weight thermoplastic polyesters and polyester blends having unexpected improved impact strength by incorporating therein linear low density polyethylene and glass fibers.

39 Claims, No Drawings

LINEAR LOW DENSITY POLYETHYLENE IMPACT MODIFIER FOR THERMOPLASTIC POLYESTERS

This invention relates to thermoplastic molding compositions, particularly thermoplastic polyester, copolyester and poly-blend molding compositions, having unexpected, improved impact strength by incorporating therein, linear low density polyethylene and glass fibers. More particularly, the invention pertains to compositions of (a) 5–92% by weight of a polyester selected from the group consisting essentially of poly(ethylene terephthalate), poly(1,4-butylene terephthalate), a copolyester, an aromatic polycarbonate, or any combination thereof, each polyester comprising 0–100% of the polyester component; (b) 3–20% by weight linear low density polyethylene; and (c) 5–50% by weight glass fibers. Optionally, these compositions may further comprise an effective amount of mica filler for reinforcement and/or warp reduction.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Further, poly(1,4-butylene terephthalate), because of its very rapid crystallization from the melt, is uniquely useful as a component in such compositions. Work pieces molded from such polyester resins, in comparison with other thermoplastics, offer a high degree of surface hardness and abrasion resistance, high gloss, and lower surface friction.

Furthermore, in particular, poly(1,4-butylene terephthalate) is much simpler to use in injection molding techniques than poly(ethylene terephthalate). For example, it is possible to injection mold poly(1,4-butylene terephthalate) at low mold temperatures of from about 30° C. to 60° C. to produce highly crystalline, dimensionally stable moldings in short cycle times. On account of the high rate of crystallization, even at low mold temperatures, no difficulty is encountered in removing the moldings from the molds. Additionally, the dimensional stability of poly(1,4butylene terephthalate) injection moldings is very good even at temperatures near or well above the glass temperature of poly(1,4-butylene terephthalate).

Simultaneously with the development of injection molding grades of polyester resins, fiber glass reinforced compositions were also provided. See for example, Furukawa et al, U.S. Pat. No. 3,368,995 and Zimmerman, U.S. Pat. No. 3,814,725, incorporated herein by reference. These injection moldable compositions provided all of the advantages of the unfilled polyesters and, also because of the glass reinforcement, the molded articles had higher rigidity, yield strength, modulus and impact strength.

Furthermore, stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference. Additionally, copolyesters and block copolyesters containing units derived primarily from poly(1,4-butylene terephthalate) and from aromatic/aliphatic or aliphatic polyesters are also known. See e.g., U.S. patent application Ser. No. 752,325, filed Dec. 20, 1976, now abandoned, incorporated herein by reference. Such copolyesters and block copolyesters are useful per se as molding resins and also in intimate combination with poly(1,4-butylene terephthalate) and/or poly(ethylene terephthalate). These compositions are said to show enhanced impact strength.

It is also known to add polyolefins, especially high pressure low density polyethylene and high pressure high density polyethylene, to thermoplastic polyesters to enhance or provide certain properties. For example, Rein et al, U.S. Pat. No. 3,405,198, disclose the use of polyethylene in poly(ethylene terephthalate) as an impact modifier. Holub et al, U.S. Pat. No. 4,122,061, disclose polyester compositions which comprise a poly(1,4-butylene terephthalate) resin, a poly(ethylene terephthalate) resin, a fibrous glass reinforcement, alone or in combination with a mineral filler and, as an impact modifier therefor, a polyolefin or olefin based copolymer resin including polyethylene and propylene-ethylene copolymer. Cohen et al, U.S. Pat. No. 4,185,047, disclose the use of high pressure low density polyethylene in thermoplastic polyester compositions, particularly poly(ethylene terephthalate) and poly(1,4-butylene terephthalate) for improved mold releasability. All of the aforementioned patents are incorporated herein by reference.

More recently, it has been discovered that linear low density polyethylene when added to an aromatic polycarbonate resin results in molding compositions having improved weld line strength and heat stability while retaining their good impact strength at increased part thickness as compared to control samples of either standard polycarbonate or a commercial polycarbonate blend with polyethylene. See for example Research Disclosure No. 20819 p. 309 August 1981. Further, copending patent applications Ser. Nos. 444,228 and 444,229, filed Nov. 24. 1982 and Ser. No. 521,199, filed Aug. 8, 1983 disclose compositions comprising linear low density polyethylene and thermoplastic polyesters or polyester blends and impact modified polyester-polycarbonate blends, respectively, having improved compatibility, weld line strength, flow properties and mold releasability, including reduced plate out. The foregoing references are incorporated herein.

It has now been discovered that thermoplastic polyester compositions show unexpected improvement in impact strength when low amounts, from about 3 to about 20% by weight, preferably 5 to 15% by weight, of linear low density polyethylene and from about 5 to 50% by weight fibrous glass are incorporated therein. The impact strength of the compositions of this invention are much improved over thermoplastic polyester compositions having incorporated therein high pressure low density polyethylene or glass or both. Although the exact mechanism by which this unexpected improvement in impact strength arises is unknown, those skilled in the art will recognize synergism between the linear low density polyethylene, at the levels used, and the glass fibers accounting for the resultant improvement.

SUMMARY

According to this invention, there are provided thermoplastic compositions which are useful for molding or extrusion, e.g., injection molding, injection blow molding, compression molding, transfer molding, profile extrusion, sheet extrusion, wire coating, extrusion blow molding and the like, the compositions having improved impact strength, comprising:

(a) 30–92% by weight of a high molecular weight polyester selected from the group consisting essentially of poly(ethylene terephthalate), poly(1,4-butylene terephthalate), copolyesters, and an aromatic polycarbonate or any combination thereof;

(b) 5–50% by weight glass fibers, alone or combined with an effective amount of reinforcing filler; and (c) 3–20% by weight of linear low density polyethylene More specifically, the composition of the present invention comprises:

(a) 30–92% by weight (i) poly(1,4-butylene terephthalate);

(ii) an aliphatic/aromatic copolyester derived from one or more dicarboxylic acids selected from the group consisting essentially of terephthalic acid; isophthalic acid; naphthalene dicarboxylic acids; phenyl indane dicarboxylic acid; compounds of the formula:

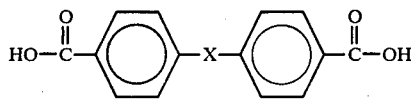

in which X may be alkylene or alkylidene of from 1 to 4 carbon atoms, carbonyl, sulfonyl, oxygen or a bond between benzene rings, and an aliphatic dicarboxylic acid having from 6 to 12 carbon atoms in the chain and one or more straight or branched chain dihydric aliphatic or cycloaliphatic glycols having from 2 to 10 carbon atoms in the chain;

(iii) a block copolyester derived from terminally-reactive blocks of (i) and terminally-reactive blocks of copolyester (ii), wherein said copolyester (ii) has at least 10% of a aliphatic units being derived from a dicarboxylic acid, or a terminally-reactive aliphatic polyester of a straight chain aliphatic or cyclo-aliphatic glycol, said blocks being connected by interterminal linkages;

(iv) poly(ethylene terephthalate)

(v) an aromatic polycarbonate of preferably bisphenol-A, or (vi) any combination thereof (b) 5–50% by weight of glass fibers, and (c) from about 3 to about 20% by weight, preferably 5 to 15% by weight most preferably 5 to 10% by weight, of linear low density polyethylene.

The compositions of the invention may also contain an effective amount of mica or clay to reduce warpage and/or talc to enhance electrical properties. Further, these compositions may contain an additional impact modifier including, but not limited to, coreshell type acrylic elastomers, ethylene-vinyl acetate copolymers and ethylene-ethylacrylate copolymers.

Furthermore, these compositions may contain one or more of the following additives: mold release agent, flame retardant, coloring agent, nucleating agents, stabilizers, fillers and flow promoters, and the like.

DETAILED DESCRIPTION OF THE INVENTION

The high molecular weight polyesters used in the practice of the present invention are polymeric glycol esters of terephthalic acid and isophthalic acid. They are widely available commercially, e.g., General Electric Company, Pittsfield, Mass.—poly(1,4-butylene terephthalate) resins under the Trademark VALOX ® and Goodyear Tire and Rubber Company, Poly(ethylene terephthalate) under the Tradename VITUF. Otherwise they can be readily prepared by known techniques, such as by the alcoholysis of esters of terephthalic and/or isophthalic acid with a glycol and subsequent polymerization, by heating glycols with free acids or with halide derivatives thereof, and similar processes. These are described in U.S. Pat. Nos. 2,465,319 and 3,047,539, and elsewhere.

Although the glycol portion of the polyester can contain from 2 to 10 atoms, it is preferred that it contain from 2 to 4 carbon atoms in the form of linear methylene chains.

Preferred polyesters will be of the family consisting of high molecular weight polymeric glycol terephthalates or isophthalates having repeating units of the general formula:

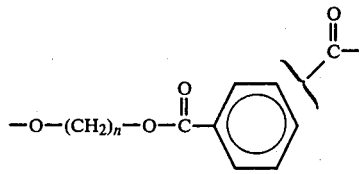

wherein n is a whole number of from 2 to 4, and mixtures of such esters, including copolyesters of terephthalic and isophthalic acids of up to 30 mole percent isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters, such as poly(1,4-butylene terephthalate), will have an intrinsic viscosity of at least about 0.7 deciliters/gram and, preferably, at least 0.8 deciliters/gram as measured in a 60:40 phenol tetrachloroethane mixture at 30° C. At intrinsic viscosities of at least about 1.0 deciliters/gram, there is further enhancement of toughness of the present compositions.

The copolyesters useful for the present compositions are preferably prepared from terephthalic acid, isophthalic acid, or reactive derivatives thereof, or any combination of the foregoing, and a glycol, which may be a straight or branched chain aliphatic and/or cycloaliphatic glycol. Illustratively, the glycol will be ethylene glycol; 1,4-butanediol; 1,5-pentanediol; 1,6-hexanediol; 1,9-nonanediol; 1,10-decanediol; neopentyl glycols; 1,4-cyclohexanediol; 1,4-cyclohexane dimethanol; a mixture of any of the foregoing, or the like. Additionally, other dicarboxylic acids useful for the acid component of the copolyesters include, without limitation, aromatic dicarboxylic acids such as napthalene dicarboxylic acid, and compounds of the formula:

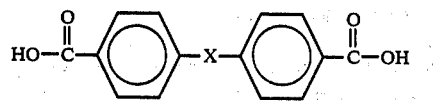

in which X may be alkylene or alkylidene of from 1 to 4 carbon atoms, carbonyl, sulfonyl, oxygen or a bond between the benzene rings, and the like, and aliphatic dicarboxylic acids having from 6 to 12 carbon atoms in the chain including suberic acid, sebacic acid, azelaic acid, adipic acid and the like.

The foregoing copolyesters may be prepared by ester interchange in accordance with standard procedures. These copolyesters may preferably be derived from at least 50% poly(1,4-butylene terephthalate) units.

Also useful for the compositions of the present invention are block copolyesters derived from blocks of (i) terminally-reactive poly(1,4-butylene terephthalate), preferably of low molecular weight, and (ii) terminally-reactive copolyesters, as described above, or (iii) a terminally-reactive aliphatic polyester, or any combination thereof. The terminal groups can comprise hydroxyl, carboxyl, carboalkoxy, and the like, including reactive derivatives thereof.

Generally, these block copolyesters may be prepared by reacting the aforementioned terminally-reactive units in the presence of a catalyst for transesterification, such as zinc acetate, manganese acetate, titanium esters and the like. After initial mixing polymerization is carried out under standard conditions, e.g., 220° to 280° C., in a high vacuum e.g., 0.1 to 2 mm Hg, to form the block copolymer of minimum randomization in terms of distribution of chain segments. These block copolyesters are described in U.S. patent application Ser. No. 752,325, filed Dec. 20, 1976, now abandoned, incorporated herein by reference.

Preferably, the copolyester units (ii) are derived from an aliphatic glycol and a mixture of aromatic and aliphatic dibasic acids in which the mole ratio concentration of aromatic to aliphatic acids is from 1 to 9 to about 9 to 1, with an especially preferred range being from about 3 to 7 to about 7 to 3.

Further, the terminally-reactive aliphatic polyester units (iii) will contain substantially stoichiometric amounts of the aliphatic diol and the aliphatic dicarboxylic acid, although hydroxy-containing terminal groups are preferred.

In addition, to their ease of formation by well known procedures, both the aromatic/aliphatic copolyesters (ii) and the aliphatic polyesters (iii) are commercially available. One source for such materials is the Ruco Division/Hooker Chemical Company, Hicksville, N.Y., which designates its compounds as "Rucoflex".

In general, the block copolyesters useful for the invention preferably comprise from 95 to 50 parts by weight of segments of poly(1,4-butylene terephthalate). Those poly(1,4-butylene terephthalate) blocks, before incorporation into the block copolyester, will preferably have an intrinsic viscosity of above 0.1 dl/g. and more preferably, between 0.1 to 0.5 dl/g., as measured in a a 60:40 mixture of phenol tetrachlorethane at 30° C. The balance, 50 to 5 parts by weight of the block copolyester will comprise blocks of copolyester (ii) and aliphatic polyester (iii) above.

As will be understood by those skilled in the art, the poly(1,4-butylene terephthalate) block can be straight chain or branched, e.g., by use of a branching component which contains at least 3 ester-forming groups. This can be a polyol, e.g., pentaerythritol, trimethylolpropane, and the like, or a polybasic acid compound, e.g., trimethyl trimesitate, and the like. Branched poly(1,4-butylene terephthalate) resins and their preparation are described in Borman, U.S. Pat. No. 3,953,404, incorporated herein by reference.

The invention is also useful for high molecular weight aromatic polycarbonates and blends of polycarbonate with poly(ethylene terephthalate) and/or any of the foregoing poly(1,4-butylene terephthalate) resins. The aromatic polycarbonate resins useful for the invention include any of those known in the art. Generally speaking, said polycarbonates may be prepared by reacting a dihydric phenol with a carbonate precursor such as phosgene, a haloformate or a carbonate ester. Such carbonate polymers may be typified as possessing recurring structural units of the formula:

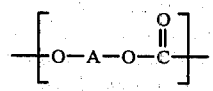

Where A is a divalent aromatic radical of the dihydric phenol employed in the polymer producing reaction. By "high molecular weight" aromatic carbonate polymers, carbonate polymers having intrinsic viscosities (as measured in methylene chloride in deciliters/gram at 25° C.) of greater than about 0.30.

The dihydric phenols which may be used to produce such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2-bis-(4-hydroxylphenyl)propane; 2,2-bis-(4-hydroxy phenyl)pentane; 2,2-bis-(4-hydroxy 3-methyl phenyl)-propane; 2,2-bis-(4-hydroxy 3,5-dichlorophenyl)-propane; 2,2-bis-(4-hydroxy 3,5-dibromophenyl)propane; 1,1-bis-(4-hydroxy phenyl)ethane, and 4,4-dihydroxy-3,3-dichlorodiphenyl ether. A variety of additional dihydric phenols which may be employed to provide such carbonate polymers are disclosed in Goldberg—U.S. Pat. No. 2,993,835—assigned to the assignee of the present invention incorporated hereby by reference. Most preferably, the dihydric phenol used in 2,2-bis-(4-hydroxy phenyl)propane.

It is of course possible to employ two or more different dihydric phenols or a dihydric phenol in combination with a glycol, a hydroxy or acid terminated polyester, or a dibasic acid in the event a carbonate copolymer rather than a homopolymer is desired. Thus it should be understood that the term polycarbonate resin embraces within its scope carbonate copolymers.

The invention is also applicable to blends of poly(ethylene terephthalate), poly(1,4-butylene terephthalate), the foregoing copolyesters and/or block copolyesters and/or derivatives thereof, aromatic polycarbonates, or any combination of these.

The true invention as manifested by the unexpected improvement in impact strength of any one or combination of the foregoing polymers is the incorporation therein of glass fibers and 3 to 20% preferably 5 to 15% by weight of linear low density polyethylene.

The linear low density polyethylene useful for the present invention are well known materials, they are available commercially, e.g. from Exxon under the tradename Escorene, from Dow Chemicals under the tradename DOWLEX or from Union Carbide under the tradename G Resins. Alternatively, they may readily be prepared by state of the art polymerization processes such as those described in U.S. Pat. No. 4,354,009, U.S. Pat. No. 4,076,698, European Patent Application 4645 (published Oct. 17, 1979), and U.S. Pat. No. 4,128,607, all incorporated herein by reference. These polymers have a density between about 0.89 and about 0.96 gram/cc, preferably between about 0.915 and 0.945 grams/cc. These linear low density polyethylene polymers are actually copolymers of ethylene and a minor amount, less than 20 mole percent, preferably less than 15 mole %, of an alpha olefin of 3 to 15 carbon atoms, preferably 3 to 10 carbon atoms, most preferably 4 to 8 carbon atoms. These linear low density polyethylenes are distinguishable from polymers such as high pressure low density polyethylene and high density polyethylene made from coordination catalyst systems in that they are substantially free of side chain branching, having a controlled concentration of simple side chain branching as opposed to random branching.

The preferred linear low density polyethylene copolymers are prepared from ethylene and one or more alpha olefins selected from the group consisting of propylene, butene-1, pentene-1, 4 methyl pentene-1, hexene-1 and octene-1, most preferably butene-1 and octene-1. Polymers of desired density may be obtained by controlling the copolymerization ratio of alpha olefin and the formation proportion of the polymer during copolymerization. The addition of increasing amounts of the comonomers to the copolymers results in lowering the density of the copolymer.

In general, the copolymerization of linear low density polyethylene can take place in either a gas phase fluidized bed reactor or liquid phase solution process reactor, preferably the former, at pressures ranging from normal to 5000 psi, preferably less than 1000 psi and at temperatures of from 20° C. to 310° C., preferably 30° C. to 115° C. in the presence of suitable high activity catalysts. Typical catalyst systems comprise transition metal complex catalyst preferably composed of at least one compound of a transition element of groups IVa, Va, and VIa having a halide and/or hydrocarbon group attached to said transition metal and a reducing component such as a metal halide or a compound having metal attached directly to carbon, e.g. metal alkyl. Highly satisfactory catalyst systems have a halide of titanium and wherein the effective organo metallic components are metal alkyl compounds having aluminum as the metal, especially LiAl(hydrocarbon)$_4$. Such systems include for example TiCl$_4$ & LiAl(alkyl)$_4$, VOCl$_3$ & Li(alkyl), MoCl$_3$ & Al(Alkyl)$_3$, TiCl$_4$ & alkylMgBr, etc. Catalyst systems such as these as well as other useful catalysts systems are disclosed in U.S. Pat. No. 4,354,009, U.S. Pat. No. 4,076,698, Eur. Application 4645 and U.S. Pat. No. 4,128,607 above. Such catalyst systems are used in a molar ratio of ethylene to catalyst in a range of 35,000 to 400,000 to one.

The preferred linear low density polyethylene copolymers so produced have an unsaturated group content of $\leq 1$ and preferably from about 0.1 to about 0.3 C=C/1000 carbon atoms and a n-hexane extractables content (at 50° C.) of less than about 3 preferably less than 2 weight percent. The preferred materials are made by the Unipol process which is described in Chem. Eng., Dec. 3, 1979, pp. 80–85 which is incorporated by reference.

The compositions of the present invention must also contain glass fibers. The fibrous (filamentous) glass may be untreated, or preferably, treated with silane or titanate coupling agents, etc. The filamentous glass to be employed are well known in the art and are widely available from a number of manufacturers.

For compositions ultimately to be employed for electrical uses, it is preferred to use fibrous glass filaments comprised of lime-aluminum borosilicate glass that is soda free. This is commonly known as "E" glass. However, other glasses are useful where electrical properties are not so important, e.g., the low soda glass known as "C" glass. Most preferred, however, is "G" filament of "E" glass because of its smaller diameter than "K" filament. The filaments are made by standard process e.g., by steam or air blowing, flame blowing and mechanical pulling. The preferred filaments for plastic reinforcement are made by mechanical pulling.

The length of the glass filaments and whether or not they are bundled into fibers and the fibers bundled in turn to yarns, ropes or rovings, or woven into mats, and the like are not critical to the invention. However, in preparing the molding compositions, it is convenient to use the filamentous glass in the form of chopped strands of from about one eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.125 inch.

Optionally, the composition of the present invention may further comprise an effective amount of any of the known impact modifiers useful for polyesters including polycarbonates, and polyester blends.

The preferred impact modifiers generally comprise an acrylic or methacrylic grafted polymer of conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain units derived from butadiene or isoprene, alone or in combination with a vinyl aromatic compound, or n-butyl acrylate, alone or in combination with a vinyl aromatic compound. The aforementioned impact modifiers are believed to be discharged in Fromuth et al U.S. Pat. No. 4,180,494; Owens U.S. Pat. No. 3,808,180; Farnham et al U.S. Pat. No. 4,096,202; and Cohen et al U.S. Pat. No. 4,260,693, all incorporated herein by reference. Most preferably, the impact modifier will comprise a two stage polymer having either a butadiene or n-butyl acrylate based rubbery core and a second stage polymerized from methymethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated herein by reference. These impact modifiers comprise, generally, a relatively high content of a crosslinked butadiene polymer grafted base having grafted thereon acrylonitrile and styrene.

Other suitable impact modifiers include, but are not limited to ethylene vinyl acetate, ethylene ethylacrylate copolymers, etc.

The compositions of the present invention can be rendered flame retardant with an effective amount of conventional flame retardant agents. As is well known, flame retardants can be based on elementary red phosphorus, phosphorus compounds, halogen and nitrogen compounds, alone or preferably in further combination with synergists, such as antimony compounds. Especially useful are polymeric and oligomeric flame retardant agents comprising tetrabromo bisphenol-A carbonate units, e.g. Wambach-U.S. Pat. No. 3,833,685, incorporated herein by reference.

The compositions of the present invention may further comprise fillers such as, but not limited to, mica or clay for reinforcement and warp reduction or talc for electrical properties, in effective amounts.

Finally, the compositions of this invention may also contain effective amounts of any one or more of the following additives: flow promoters, nucleating agents, coloring agents, stabilizers, coupling agents, and the like.

The proportionment of the ingredients of the compositions of the invention vary depending upon the number of ingredients, the specific ingredients used and the desired properties and end uses for the plastics so produced. In general, the compositions comprise in percent by weight based on the final composition, 30 to 92% of a thermoplastic polyester resin, including blends, 3 to 20% linear low density polyethylene and 5 to 50% of glass fibers. Preferably, the composition comprises 30 to 80% polyester, 5 to 15% linear low density polyethylene and 15–35% glass. Furthermore, the thermoplastic polyester resin itself comprises 0–100% poly(ethylene terephthalate), 0–100% of a poly(1,4-butylene terephthalate) resin, and 0–100% of an aromatic polycarbonate, or any combination thereof wherein the total is 100%. Optionally, a preferred composition may also contain 0–40% by weight of mica or clay for reinforcement and warpage reduction or 0–40% by weight of talc for electrical properties. Further, the compositions may contain up to 25%, preferably 5–25% of an impact modifier.

The compositions of the present invention are prepared in conventional ways. For example, in one method, the linear low density polyethylene and glass are placed into an extrusion compounder with the thermoplastic polyester resin to produce molding pellets. The linear low density polyethylene and glass is thus dispersed in a matrix of the thermoplastic polyester. In another procedure, the linear low density polyethylene and the glass are mixed with the thermoplastic polyester resin by dry-blending, then either fluxed on a mill and comminuted, or extruded and chopped. Alternatively, the ingredients can be mixed with the powdered or granular thermoplastic polyester resin and directly molded, e.g., by injection or transfer molding techniques.

Ordinarily, it is important to thoroughly free the ingredients from as much water as possible. However, it has recently been disclosed that polyester molding compositions may be prepared having a small moisture content. See Lu et al, U.S. Pat. No. 4,351,758 hereby incorporated by reference. Furthermore, compounding should be carried out to insure that the residence time in the machine is short; the temperature carefully controlled; the friction heat is utilized, and an intimate blend between the additives and the thermoplastic resin is obtained.

Although it is not essential, best results are obtained if the ingredients are precompounded, pelletized, and then molded. Precompounding can be carried out in conventional equipment. For example, after carefully predrying the thermoplastic polyester, e.g., at 125° C. for 4 hours, a single screw extruder is fed with a dry blend of the polyester resin, the linear low density polyethylene and the glass, and whatever other additives may be used, if any; the screw employed having a long transition and metering section to insure melting. On the other hand, a twin screw extrusion machine, e.g., a 28 mm Werner Pfleiderer machine can be fed with resin, linear low density polyethylene and glass at the feed port. In either case, a generally suitable machine temperature will be about 450° to 570° F.

The precompounded composition can be extruded and cut up into molding compounds such as conventional granules, pellets, etc., by standard techniques.

The compositions of this invention can be molded in any equipment conventionally used for thermoplastic compositions. For example, with poly(1,4-butylene terephthalate) based compositions, good results will be obtained in an injection molding machine, e.g., of the Newbury type with conventional cylinder temperature, e.g., 450° F. and conventional mold temperatures, e.g., 150° F. On the other hand, with poly(ethylene terephthalate) based compositions, because of the lack of uniformity of crystallization from interior to exterior of thick pieces, somewhat less conventional but still well known techniques can be used. For example, a nucleating agent such as LiOH, sodium stearate, graphite, or a metal oxide, e.g., ZnO or MgO, can be included and standard mold temperatures of at least 180° F. will be used.

DESCRIPTION OF THE PREFERRED EMBODIMENTS

In order that those skilled in the art may better understand how to practice the present invention, the following examples are given by way of illustration and not by way of limitation.

EXAMPLE 1–7 AND COMPARATIVE EXAMPLES 1–4

Dry blends of poly(1,4-butylene terephthalate) resin, glass and linear low density polyethylene were compounded and extruded through a single screw extruder at 500° to 550° F. For comparative purposes dry blends of poly(1,4-butylene terephthalate) and linear low density polyethylene and poly(1,4-butylene terephthalate) and glass were similarly prepared. The extrudates were pelletized and injection molded at 490° F. on a Van Dorn molding machine, mold temperature 150° F. The formulations and physical properties are shown in Table 1.

As is apparent from the results shown in Table 1, adding linear low density polyethylene alone to poly(1,4-butylene terephthalate) has very little effect on the properties thereof (Comparative Examples 1–3). Further, as is well known in the art, the addition of glass fibers to poly(1,4-butylene terephthalate) improves the Notched Izod impact strength (Comparative Example 4).

TABLE 1

|  | CE1 | CE2 | CE3 | CE4 | E1 | E2 | E3 | E4 | E5 | E6 | E7 |
|---|---|---|---|---|---|---|---|---|---|---|---|
| PBT[a] | 99.8 | 94.8 | 94.8 | 69.8 | 64.8 | 61.8 | 61.8 | 61.8 | 58 | 58 | 58 |
| Glass[b] | — | — | — | 30 | 30 | 33 | 33 | 33 | 35 | 35 | 35 |
| LPX-11[c] | — | 5 | — | — | 5 | — | — | — | 7 | — | — |
| LPX-15[d] | — | — | 5 | — | — | 5 | — | — | — | 7 | — |
| DOWLEX[e] | — | — | — | — | — | — | 5 | — | — | — | — |
| G7340[f] | — | — | — | — | — | — | — | 5 | — | — | — |
| LPX7[g] | — | — | — | — | — | — | — | — | — | — | 7 |
| Notched Izod ft.-lb./in. | 1.0 | 1.01 | 1.02 | 2.2 | 2.7 | 3.34 | 3.39 | 3.45 | 3.2 | 3.1 | 2.09 |
| Unnotched Izod ft.-lb./in. | NB | NB | NB | 12.6 | 12.0 | 13.6 | 14.6 | 13.9 | — | — | — |

[a] General Electric Company - VALOX
[b] Certain Teed - K filament glass
[c,d,g] Exxon - linear low density polyethylene derived from ethylene and butene-1, melt indeces 50, 20 and 0.8 g/10 min., respectively
[e] Dow Chemical Co. - linear low density polyethylene derived from ethylene and octene-1, melt index 4 g/10 min.
[f] Union Carbide - G Resin linear low density polyethylene derived from ethylene and butene-1, melt index 0.8.
NOTE: All formulations contain 0.20% by weight of stabilizer.

However, totally unpredicted is the significant improvement in noched izod impact strength when both glass fibers and linear low density polyethylene is added to poly(1,4-butylene terephthalate), Examples 1–7. Improvement is also apparent in the unnotched izod impact strength in examples 2–4 of the invention as compared to glass reinforced poly(1,4-butylene terephthalate) of comparative Example 4.

Finally, it is also evident from Table 1, examples 1 through 7, that this effect is not specific to one species of linear low density polyethylene nor for just low levels as both 5% and 7% by weight linear low density polyethylene improved impact strength. Further, as shown in these examples, the melt indices of the linear low density polyethylene, even within the same species, may vary widely with only a slight variation in the resultant improved impact strength.

EXAMPLES 8–14 and COMPARATIVE EXAMPLE 5–6

Dry blends of poly(1,4-butylene terephthalate), glass, linear low density polyethylene and polycarbonate or poly(ethylene terephthalate) or both were prepared according to the method disclosed in examples 1–7. The specific compositions and physical properties thereof are shown in Table 2.

TABLE 2

|  | CE5 | CE6 | E8 | E9 | E10 | E11 | E12 | E13 | E14 |
|---|---|---|---|---|---|---|---|---|---|
| PBT[a] | 69.8 | 47 | 64.8 | 54.8 | 49.8 | 29.8 | 20.0 | 47 | 41.9 |
| Glass[b] | 30 | 30 | 30 | 30 | 30 | 30 | 33 | 30 | 30 |
| LPX[c] | — | — | 5 | 5 | 10 | 10 | 5 | — | — |
| PC[d] | — | 20 | — | 10 | 10 | 10 | 41.6 | 20 | 20 |
| PET[e] | — | — | — | — | — | 20 | — | — | — |
| LPX-15[f] | — | — | — | — | — | — | — | 1.0 | 5.0 |
| Notched Izod ft.-lb./in. | 1.97 | 2.1 | 2.64 | 2.68 | 2.91 | 2.83 | 3.57 | 2.05 | 2.96 |
| Unnotched Izod ft.-lb./in. | 12.6 | 12.6 | 13.2 | 14.9 | 13.0 | 12.1 | 13.7 | 12.6 | 14.6 |

[a] General Electric Company - VALOX
[b] Certain Teed - K filament Glass
[c,f] Exxon - Escorane linear low density polyethylene derived from ethylene and butene-1, melt indices 50 & 20 gm/10 min., respectively.
[d] General Electric Company - LEXAN ® polycarbonate
[e] Goodyear - VITUF - VFR series
NOTE: All formulations contain 0.20% by weight of stabilizer.

Once again, from comparative example 5 and example 8, it is evident that the incorporation of linear low density polyethylene greatly increases the impact strength of reinforced poly(1,4-butylene terephthalate). Further, as shown in comparative Example 6 and examples 9–14, the impact strength of glass reinforced polyester blends of poly(1,4-butylene terephthalate) and polycarbonate or poly(1,4-butylene terephthalate) and both polycarbonate and poly(ethylene terephthalate) are greatly increased by the addition of linear low density polyethylene at both high and low levels of incorporation, but not at 1% levels.

EXAMPLES 15–22

Dry blends of filled and unfilled, glass reinforced polyblends of poly(1,4-butylene terephthalate) and poly(ethylene terephthalate) or an aromatic polycarbonate having incorporated therein linear low density polyethylene alone or with a certain amount of an additional impact modifier comprising either ethylene-vinyl acetate copolymer, ethylene ethylacrylate copolymer or core-shell type acrylic elastomers were prepared according to the procedure in Examples 1–7 the compositions and physical properties thereof are shown in Table 3.

TABLE 3

|  | E15 | E16 | E17 | E18 | E19 | E20 | E21 | E22 |
|---|---|---|---|---|---|---|---|---|
| PBT[a] | 29.8 | 29.8 | 29.8 | 39.8 | 39.8 | 39.8 | 39.3 | 39.3 |
| PET[b] | 20 | 20 | 20 | 20 | 20 | 20 | — | — |
| Glass[c] | 20 | 20 | 20 | 30 | 30 | 30 | 30 | 30 |

TABLE 3-continued

|  | E15 | E16 | E17 | E18 | E19 | E20 | E21 | E22 |
|---|---|---|---|---|---|---|---|---|
| Mica | 20 | 20 | 20 | — | — | — | — | — |
| LPX-11[d] | 10 | 7 | 7 | 10 | 7 | 7 | 5 | 10 |
| EEA[i] | — | 3 | — | — | 3 | — | — | — |
| EVA[e] | — | — | 3 | — | — | 3 | — | — |
| KM330[g] | — | — | — | — | — | — | 10 | 5 |
| PC[h] | — | — | — | — | — | — | 15 | 15 |
| Notched Izod ft.-lb./in. | 1.37 | 1.38 | 1.35 | 2.7 | 2.7 | 2.7 | 3.7 | 3.3 |
| Unnotched Izod ft.-lb./in. | 8.8 | 8.4 | 8.2 | 14.5 | 15.5 | 15.0 | 17.1 | 14.8 |

[a]General Electric Company - VALOX
[b]Goodyear Tire & Rubber Co. - VITUF VFR Series
[c]Certain Teed - K filament Glass
[d]Exxon - Escorene - linear low density polyethylene derived from ethylene and butene-1, melt index 50 gm/10 min.
[e]DuPont - ethylene-vinyl acetate copolymer
[g]Rohm & Haas - KM Series, crosslinked acrylate core with graft linking monomer and a second state polymerized from methyl methacrylate
[h]General Electric Company - LEXAN
[i]Union Carbide - ethylene ethylacrylate copolymer
NOTE: All formulations contain 0.20% by weight of stabilizer.

Once again, the impact properties of the polyblend compositions are improved by the incorporation therein of linear low density polyethylene. This is true for filled compositions as well: the addition of mica accounting for a reduction in warpage. Although the addition of mica to these compositions reduces impact strength, compare examples 15 and 18, good impact strength is still achieved, examples 15-17.

Furthermore, as shown in examples 16 and 19, examples 17 and 20 and examples 21 and 22, certain accounts of ethylene ethylacrylate, ethylene vinyl acetate, and core-shell acrylate elastomers (KM330), respectively, may be added to or substituted in part for or by a certain amount of the linear low density polyethylene with the compositions retaining the improved impact strength realized from the linear low density polyethylene.

EXAMPLES 23-28

Additional mica filled compositions further containing talc for electrical properties, or flame retardant were prepared according to the aforementioned procedures. The compositions and physical properties are shown in Table 4.

TABLE 4

|  | E23 | E24 | E25 | E26 | E27 | E28 |
|---|---|---|---|---|---|---|
| PBT[a] | 10 | 10 | — | — | 29 | 29 |
| PET[b] | 39.8 | 39.8 | 49.8 | 49.8 | 8 | 8 |
| Glass[c] | 15 | 15 | 15 | 15 | 20 | 20 |
| Mica | 25 | 15 | 20 | 15 | 20 | 20 |
| LPX-11[d] | 10 | 10 | 10 | 10 | 7 | 7 |
| TALC | — | 10 | 5 | 10 | — | — |
| Flame Retardant Concentrate | — | — | — | — | 16 | 16 |
| Notched Izod ft.-lb./in. | 0.92 | 0.85 | 0.86 | 0.82 | 1.2 | 1.2 |
| Unnotched Izod ft.-lb./in. | — | — | — | — | 7.2 | 5.6 |

[a]General Electric Company - VALOX
[b]Goodyear Tire & Rubber Co. - VITRUF VFR Series
[c]Certain Teed - K filament Glass
[d]Exxon - Escorene - linear low density polyethylene derived from ethylene and butane-1, melt index 50 gm/10 min.
NOTE: All formulations contain 0.20% by weight of stabilizer.

Examples 23-28 demonstrate that good impact strength was retained in mica filled, glass reinforced poly blends of high poly(ethylene terephthalate) content having incorporated therein moderate amounts of linear low density polyethylene when varying amounts of talc were added to enhance electrical properties.

Furthermore, examples 27 and 28 demonstrate that good impact strength is likewise retained in compositions of the present invention which have been rendered flame retardant.

Obviously, other modifications and variations of the present invention are possible in light of the above teachings. All such obvious modifications which may be made in the particular embodiments described above are within the full scope of the invention as defined in the appended claims.

I claim:

1. A thermoplastic molding composition having improved impact strength comprising
   (a) from about 5 to about 92% by weight of at least one high molecular weight polymer selected from the groups consisting essentially of (a) poly(ethylene terephthalate), (b) poly(1,4-butylene terephthalate), (c) a copolyester of (a) or (b), and (d) a blend of (a), (b), or (c) with an aromatic polycarbonate resin or any combination thereof, wherein any one polymer comprises 0-100% of the polymer component;
   (b) from about 3 to about 20% by weight of a linear low density polyethylene having a density of from about 0.89 to 0.96 grams/cc, and
   (c) from about 5 to 50% by weight glass fibers.

2. The composition of claim 1 wherein the polymer is poly(ethylene terephthalate).

3. The composition of claim 1 wherein the polymer is poly(1,4-butylene terephthalate).

4. The composition of claim 1 wherein the polymer is a copolyester derived from one or more aliphatic and/or aromatic dicarboxylic acids and one or more aliphatic or cycloaliphatic glycols.

5. The composition of claim 4 wherein the copolyester is a random copolyester.

6. The composition of claim 4 wherein the copolyester is a block copolyester.

7. The composition of claim 1 wherein the polymer is an aromatic polycarbonate resin.

8. The composition of claim 7 wherein the polycarbonate is derived from 2,2-Bis(4-hydroxyphenyl)propane.

9. The composition of claim 1 wherein the polymer is a blend of poly(ethylene terephthalate) and poly(1,4-butylene terephthalate).

10. The composition of claim 1 wherein the polymer is a blend of poly(1,4-butylene terephthalate) and aromatic polycarbonate.

11. The composition of claim 1 wherein the polymer is a blend of poly(ethylene terephthalate), poly(1,4-butylene terephthalate) and aromatic polycarbonate.

12. The composition of claim 1 wherein the linear low density polyethylene has a density of from about 0.915 to about 0.945 grams/cc.

13. The composition of claim 1 wherein the linear low desnity polyethylene is a copolymer derived from ethylene and a minor amount of an alpha-olefin having 3 to 10 carbon atoms.

14. The composition of claim 1 wherein the linear low density polyethylene is a copolymer derived from ethylene and a minor amount of an alpha-olefin having 4 to 8 carbon atoms.

15. The composition of claim 14 wherein the linear low density polyethylene copolymer is derived from ethylene and butene-1.

16. The composition of claim 14 wherein the linear low density polyethylene copolymer is derived from ethylene and octene-1.

17. The composition as defined in claim 1 wherein the linear low density polyethylene comprises from about 5 to about 15% by weight of the composition.

18. The composition of claim 1 further comprising from about 5 to about 25% by weight of an impact modifier selected from the group consisting of core-shell acrylic elastomers, acrylic copolymers, and vinylic copolymers.

19. The composition of claim 18 wherein the impact modifier is a core-shell acrylic elastomer.

20. The composition of claim 19 wherein the impact modifier has a butadiene based rubbery core and a second stage polymerized from styrene and methylmethacrylate.

21. The composition of claim 19 wherein the impact modifier has a poly styrene-butadiene rubbery core and a second stage polymerized from styrene and methylmethacrylate.

22. The composition of claim 19 wherein the impact modifier has a crosslinked acrylic first stage also containing graft linking monomer and a second stage polymerized from methyl methacrylate.

23. The composition of claim 19 wherein the impact modifier is an ABS graft copolymer having a relatively high content of a cross-linked butadiene polymer graft base with acrylonitrile and styrene grafted thereon.

24. The composition as defined in claim 18 wherein the impact modifier is an acrylic copolymer.

25. The composition as defined in claim 24 wherein the acrylic copolymer is ethylene ethylacrylate.

26. The composition as defined in claim 24 wherein the acrylic copolymer is methacrylate-butadienestyrene.

27. The composition of claim 18 wherein the impact modifier is a vinylic copolymer.

28. The composition of claim 27 wherein the vinylic copolymer is ethylene vinyl acetate.

29. The composition of claim 27 wherein the vinylic copolymer is styrene-butadiene-styrene.

30. The composition of claim 1 further comprising an effective amount of mica or clay to reduce warpage.

31. The composition of claim 30 wherein the mica or clay comprises up to 40% by weight of the composition.

32. The composition of claim 18 further comprising an effective amount of mica or clay to reduce warpage.

33. The composition of claim 1 further comprising a flame retardant amount of a flame retarding agent.

34. The composition of claim 33 wherein the flame retarding agent comprises a flame retardant compound in combination with a flame retardant synergist.

35. The composition of claim 30 further comprising a flame retardant amount of a flame retarding agent.

36. The composition of claim 1 further comprising an effective amount of talc to enhance electrical properties.

37. The composition of claim 36 wherein the talc comprises up to 40% by weight of the composition.

38. The composition of claim 30 further comprising an effective amount of talc to enhance electrical properties.

39. The composition of claim 1 further comprising at least one additive selected from the group consisting of flow promoters, other fillers and reinforcing fillers, coloring agents, drip retardants, nucleating agents, coupling agents and stabilizers, in effective amounts.

* * * * *